US012691932B2

(12) United States Patent　　　　　(10) Patent No.: US 12,691,932 B2
Pelludat et al.　　　　　　　　　　　　(45) Date of Patent: Jul. 28, 2026

(54) STEERING DEVICE AND METHOD FOR OPERATING THE STEERING DEVICE

(71) Applicant: Robert Bosch GmbH, Stuttgart (DE)

(72) Inventors: Sebastian Pelludat, Schorndorf (DE); Claus-Dieter Mueller, Waldstetten (DE); Dominik Erdmann, Stuttgart (DE); Edgar Rot, Moeglingen (DE); Hannes Jochim, Kirchberg And der Murr (DE); Hemanth Kumar Govindarajulu, Bietigheim-Bissingen (DE); Marcel Niess, Steinheim (DE); Marian Eirich, Remseck (DE); Marianna Salaris, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 19/046,213

(22) Filed: Feb. 5, 2025

(65) Prior Publication Data

US 2025/0263117 A1　　Aug. 21, 2025

(30) Foreign Application Priority Data

Feb. 15, 2024　(DE) ..................... 10 2024 201 383.8

(51) Int. Cl.
　　B62D 5/04　　　　(2006.01)
　　B62D 15/02　　　(2006.01)
(52) U.S. Cl.
　　CPC ............. B62D 5/049 (2013.01); B62D 5/046 (2013.01); B62D 15/0225 (2013.01)

(58) Field of Classification Search
　　CPC ..... B62D 5/046; B62D 5/049; B62D 15/0225
　　USPC .............................................. 701/41, 42, 43
　　See application file for complete search history.

(56) References Cited

U.S. PATENT DOCUMENTS

| | | | | |
|---|---|---|---|---|
| 11,609,567 B2 * | 3/2023 | Kim | ..................... | B62D 5/0481 |
| 11,738,799 B2 * | 8/2023 | Farhat | .................. | B62D 5/0463 |
| | | | | 180/443 |
| 12,252,191 B2 * | 3/2025 | Sun | ..................... | B62D 5/0484 |
| 2020/0076343 A1 * | 3/2020 | Zhang | ..................... | H02P 23/12 |
| 2025/0136173 A1 * | 5/2025 | Lee | ......................... | B62D 5/046 |

* cited by examiner

*Primary Examiner* — Erick R Solis
(74) *Attorney, Agent, or Firm* — Maginot, Moore & Beck LLP

(57)　　　　　ABSTRACT

A steering device includes a steering rack, an electric motor for setting a position of the steering rack, a first control unit for controlling the electric motor depending on a deviation of an actual position of the steering rack from a target position of the steering rack, a second control unit for controlling the electric motor as a function of the deviation of the actual position from the target position, and a device for switching from control of the electric motor by the first control unit to control of the electric motor by the second control unit. The device is configured to switch from control of the electric motor by the first control unit to control of the electric motor by the second control unit as a function of a deviation of an actual value from a target value.

13 Claims, 2 Drawing Sheets

1

STEERING DEVICE AND METHOD FOR OPERATING THE STEERING DEVICE

This application claims priority under 35 U.S.C. § 119 to patent application no. DE 10 2024 201 383.8, filed on Feb. 15, 2024 in Germany, the disclosure of which is incorporated herein by reference in its entirety.

BACKGROUND

The disclosure relates to a steering device and a method for operating the steering device.

SUMMARY

Steering device failure is prevented by means of the steering device and method according to this disclosure. Increased requirements for control unit accuracy and/or requirements pursuant to ASIL D are met as a result.

The steering device comprises a steering rack, an electric motor for setting a position of the steering rack, a first control unit for controlling the electric motor depending on a deviation of an actual position of the steering rack from a target position of the steering rack, a second control unit for controlling the electric motor as a function of the deviation of the target position from the actual position, and a device for switching from control of the electric motor by the first control unit to control of the electric motor by the second control unit, wherein the device is configured to switch from control of the electric motor by the first control unit to control of the electric motor by the second control unit as a function of a deviation of an actual value from a target value, wherein the actual value is the actual position of the steering rack and the target value is the target position of the steering rack, or wherein the actual value is a derivative of an actual position of the steering rack and the target value is determined based on a difference between the actual position and a target position of the steering rack.

The device may be configured to monitor the deviation of the actual value from the target value and to switch from control of the electric motor by the first control unit to control of the electric motor by the second control unit, depending on the deviation of the actual value from the target value.

The device may be configured to compare the deviation of the actual value from the target value to a threshold value and to switch from control of the electric motor by the first control unit to control of the electric motor by the second control unit if the deviation of the actual value from the target value is greater than the threshold value. This means that the device is configured to recognize a necessity for switching particularly well.

The device may be configured to determine the threshold value depending on the deviation of the actual value from the target value. This means that the device is configured to adjust the threshold value to the deviation of the actual value from the target value.

The device may be configured to determine an increasingly narrow threshold value with increasing deviation of the actual value from the target value. This means that the device is configured to more sensitively adjust the threshold value as the actual value deviates from the target value.

The device may be configured to determine the threshold value for a positive deviation of the actual value from the target value as well as the threshold value for a negative deviation of the actual value from the target value. The threshold values may be the same or may be different from one another. This means that the device is configured to set asymmetrical threshold values.

A vehicle may be provided comprising the steering device.

The method for operating a steering device provides for a steering device comprising a steering rack, an electric motor for setting a position of the steering rack, a first control unit for controlling the electric motor depending on a deviation of an actual position of the steering rack from a target position of the steering rack, a second control unit for controlling the electric motor as a function of the deviation of the actual position from the target position of the steering rack, wherein it is switched from control of the electric motor by the first control unit to control of the electric motor by the second control unit as a function of a deviation of an actual value from a target value, wherein the actual value is the actual position of the steering rack and the target value is the target position of the steering rack, or wherein the actual value is a derivative of an actual position of the steering rack and the target value is determined based on a difference between the actual position and a target position of the steering rack.

The method may provide for monitoring of the deviation of the actual value from the target value and switching from control of the electric motor by the first control unit to control of the electric motor by the second control unit, depending on the deviation of the actual value from the target value. The necessity of switching is thus particularly well recognized.

The method may provide for comparing the deviation of the actual value from the target value to a threshold value and switching from control of the electric motor by the first control unit to control of the electric motor by the second control unit if the deviation of the actual value from the target value is greater than the threshold value.

The method may provide for determining the threshold value based on the deviation of the actual value from the target value. The threshold value is thus adjusted to the deviation of the actual value from the target value.

The method may provide for determining an increasingly narrow threshold value based on the deviation of the actual value from the target value. This means that the threshold value is more sensitively adjusted with increasing deviation of the actual value from the target value.

The method may provide for determining the threshold value for a positive deviation of the actual value from the target value as well as the threshold value for a negative deviation of the actual value from the target value. The threshold values may be the same or may be different from one another. This sets asymmetric threshold values.

BRIEF DESCRIPTION OF THE DRAWINGS

Further advantageous embodiments will become apparent from the following description and the drawing. The drawings show.

DETAILED DESCRIPTION

Figure 1:
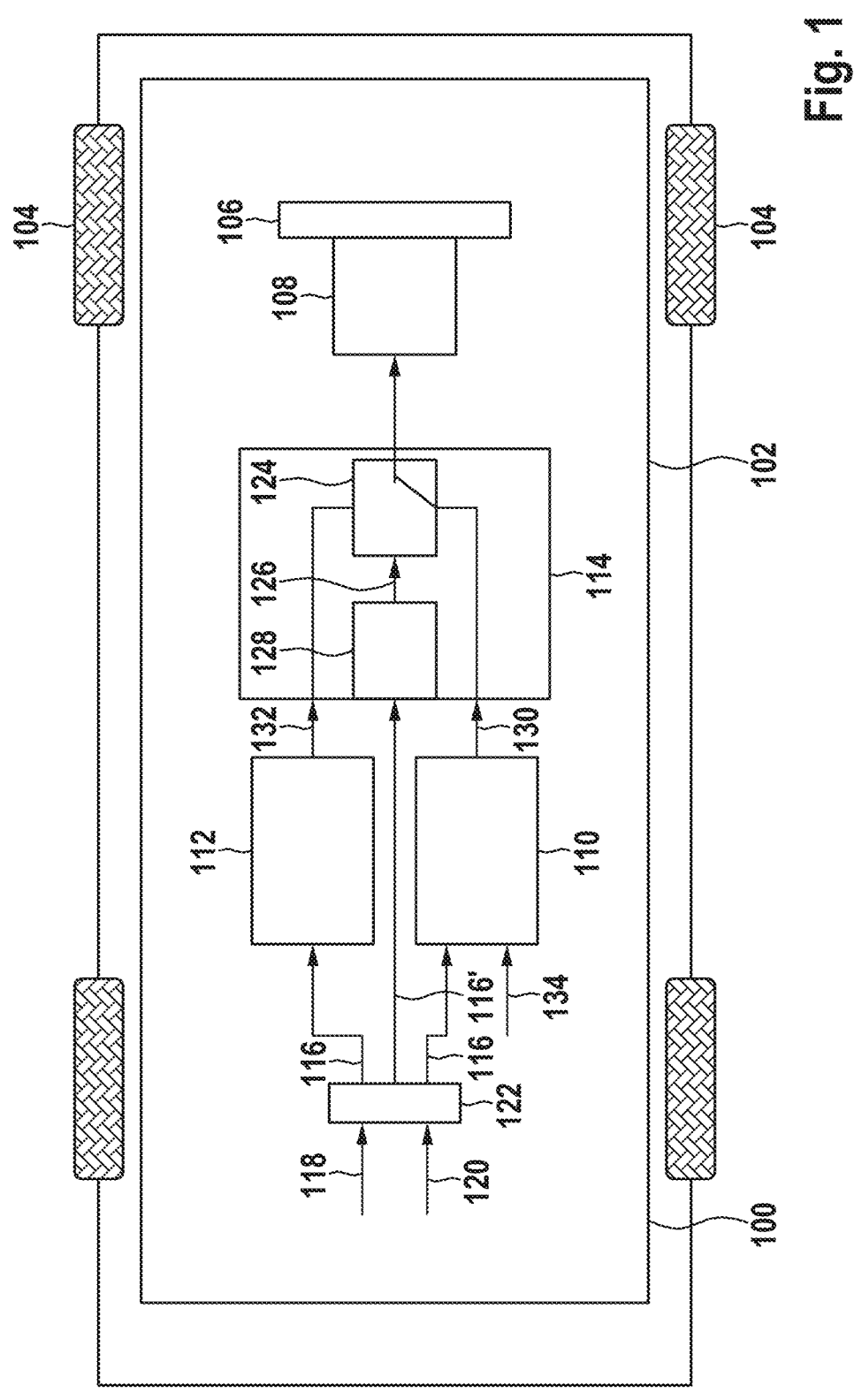
FIG. 1 a schematic representation of a vehicle with a steering system.

A vehicle 100 having a steering system 102 is schematically illustrated in FIG. 1. The steering device 104 is configured to steer guided wheels 104 of the vehicle 100.

The steering device 102 comprises a steering rack 106 configured to steer the guided wheels 104.

The steering device 102 comprises an electric motor 108 for adjusting a position of the steering rack 106.

The steering device 102 comprises a first control unit 110 for controlling the electric motor 108. The steering device 102 includes a second control unit 112 for controlling the electric motor 108. The steering device 102 includes a device 114 for switching from control of the electric motor 108 by the first control unit 110 to control of the electric motor 108 by the second control unit 112.

The first control unit 110 is configured to control the electric motor 108 as a function of a deviation 116 of an actual position 118 of the steering rack 106 from a target position 120 of the steering rack.

The second control unit 112 is configured to control the electric motor 108 as a function of a deviation 116 of the actual position 118 of the steering rack 106 from the target position 120 of the steering rack 106.

The device 114 is configured to switch from control of the electric motor 108 by the first control unit 110 to control of the electric motor 108 by the second control unit 112, depending on a deviation 116' of an actual value from a target value.

In one example, the actual value is the actual position 118 of steering rack 106 and the target value is the target position 120 of steering rack 106.

In one example, the actual value is a derivative of the actual position 118 of the steering rack 106 and the target value is determined based on a difference between the actual position 118 and the target position 120.

In the example, the steering device 102 comprises a computing device 122 configured to determine the deviation 116 of the actual position 118 from the target position 120.

In one example, the computing device 122 is configured to determine the deviation 116 of the actual position 118 from the target position 120 based on a difference between the actual position 118 and the target position 120.

In one example, the computing device 122 is configured to determine the deviation 116' of the actual value from the target value.

In one example, the actual value is the actual position 118 of steering rack 106 and the target value is the target position 120 of steering rack 106.

In one example, the actual value is a derivative of the actual position 118 of the steering rack 106 and the target value is determined based on a difference between the actual position and a target position 120 of the steering rack 106.

The device 114 is configured to monitor the deviation 116' of the actual value from the target value and to switch from control of the electric motor 108 by the first control unit 110 to control of the electric motor 108 by the second control unit 112, depending on the deviation 116'.

In the example, the device 114 comprises a switch 124 configured to switch from control of the electric motor 108 by the first control unit 110 to control of the electric motor 108 by the second control unit 112 based on a switch signal 126.

In the example, the device 114 comprises a monitoring device 128 configured to monitor the deviation 116' of the actual value from the target value and determine the switching signal 126 to switch from control of the electric motor 108 by the first control unit 110 to control of the electric motor 108 by the second control unit 112 based on the deviation 116.

The device 114, in the example the monitoring device 128, may be configured to compare the deviation 116' of the actual value from the target value to a threshold value and to switch from control of the electric motor 108 by the first control unit 110 to control of the electric motor 108 by the second control unit 112 if the deviation 116' of the actual value from the target value is greater than the threshold value.

The device 114, in the example the monitoring device 128, may provide for determining the threshold value based on the deviation 116' of the actual value from the target value.

The device 114, in the example the monitoring device 128, may provide for determining the threshold value based on the difference determined by the computing device 122 between the actual position 118 and the target position 120.

The device 114, in the example the monitoring device 128, may provide for determining an increasingly narrow threshold value with increasing deviation 116' of the actual value from the target value.

The device 114, in the example the monitoring device 128, may be configured to determine, for the deviation 116' of the actual value from the target value, both the threshold value for a positive deviation 116' of the actual value from the target value as well as the threshold value for a negative deviation 116' of the actual value from the target value.

For example, the threshold value for the positive deviation 116' of the actual value from the target value may differ from the threshold value for the negative deviation 116' of the actual value from the target value. In the example, the threshold values are provided such that a speed of the steering rack 106 is within an accepted range as long as the deviation 116' of the actual value from the target value is within the threshold values. The threshold values are provided in the example such that the device 114 is configured to switch when the speed of the steering rack 106 leaves the accepted range.

In the example, the first control unit 110 is configured to determine a first target motor torque 130 based on the deviation 116 of the actual position 118 from the target position 120, in order to control the electric motor 108.

In the example, the second control unit 112 is configured to determine a second target motor torque 132 based on the deviation 116 of the actual position 118 from the target position 120, in order to control the electric motor 108.

In the example, the electric motor 108 is controlled by either the first target motor torque 130 or the second target motor torque 132, depending on the position of the switch 124.

Figure 2:
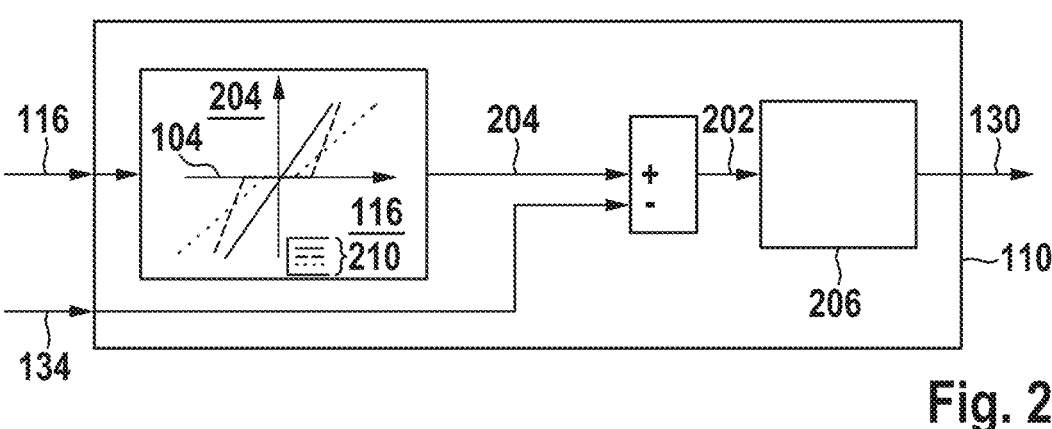
FIG. 2 an exemplary first control unit of the steering device.

An exemplary first control unit 110 is shown in FIG. 2. For example, the first control unit 110 is configured to control the first target motor torque 130 with a first torque controller 206, depending on a deviation 202 of the actual value 134 from a target value 204. The first torque controller 206 in the example is a PID controller. The first control unit 110 and the second control unit 112 differ. The first control unit 110 and the second control unit 112 are preferably different such that the same error does result in faulty motor torque in both.

In the example, the first control unit 110 is configured to determine the target value 204 based on the deviation 116 of the actual position 118 from the target position 120. In the example, the first controller 110 is configured to determine the target value 204 from a characteristic curve 208 that associates the deviation 116 with the target value 204. It may be contemplated that the characteristic curve 208 is selected from a multitude 210 of characteristic curves depending on the deviation 116 of the actual position 118 from the target position 120.

Figure 3:
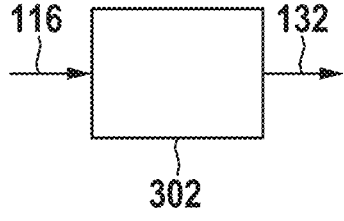
FIG. 3 an exemplary second control unit of the steering device.

An exemplary second control unit 112 is shown in FIG. 3. As an example, the second control unit 112 is configured to control the second target motor torque 132 with a second torque controller 302 depending on the deviation 116 of the actual position 118 from the target position 120. The second torque controller 302 in the example is a PID controller.

Figure 4:
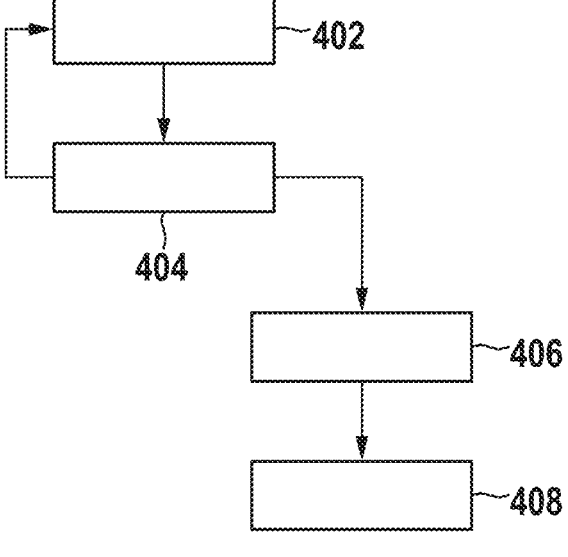
FIG. 4 a flow chart showing the steps of a method for operating the steering system.

FIG. 4 shows steps of a method for operating the steering device 102.

The method comprises a step 402.

In step 402, the electric motor 108 is controlled by the first control unit 110 depending on the deviation 116 of the actual position 118 from the target position 120.

The method comprises a step 404.

In step 404, it is determined whether or not to switch from control of the electric motor 108 by the first control unit 110 to control 408 of the electric motor 108 by the second control unit 112.

If it is determined that the control of the electric motor 108 by the first control unit 110 should be switched to control 408 of the electric motor 108 by the second control unit 112, the step 406 is performed. Otherwise, step 402 is performed.

For example, the deviation 116' of the actual value from the target value is monitored.

For example, the deviation 116' of the actual value from the target value is compared to a threshold value and it is determined that control of the electric motor 108 by the first control unit 110 should be switched to control 408 of the electric motor 108 by the second control unit 112 if the deviation 116' of the actual value from the target value is greater than the threshold value.

It may be provided that the threshold value is determined based on the deviation 116' of the actual value from the target value. It may be provided that an increasingly narrow threshold value is determined with increasing deviation 116' of the actual value from the target value.

It may be provided that the threshold value is determined from the target position 120 of the steering rack 106 depending on the deviation 116 of the actual position 118 of the steering rack 106. It may be provided that an increasingly narrow threshold value is determined with an increasing deviation 116 of the actual position 118 of the steering rack 106 from the target position 120 of the steering rack 106.

In one example, it is provided that, for the deviation 116' of the actual value from the target value, both the threshold value for a positive deviation 116' of the actual value from the target value and a negative deviation 116' of the actual value from the target value are determined, whereby the threshold values differ from one another.

This means that asymmetric threshold values are used.

In the example, the threshold value is provided such that a speed of the steering rack 106 remains within an accepted range as long as the deviation 116' of the actual value from the target value is within the threshold values. That is, the switching occurs when the speed of the steering rack 106 leaves the accepted range.

In step 406, control of the electric motor 108 by the first control unit 110 is switched to control 408 of the electric motor 108 by the second control unit 112.

This means that the deviation 116' of the actual value from the target value may be monitored and the particularly increasingly narrow threshold value is determined based on the deviation 116.

This means the deviation 116' of the actual value from the target value may be monitored and control of the electric motor 108 by the first control unit 110 may be switched to control of the electric motor 108 by the second control unit 112, depending on the deviation 116' of the actual value from the target value.

This means that the deviation 116' of the actual value from the target value may be monitored and, if there is a positive deviation 116' of the actual value from the target value that is larger than the threshold value for the positive deviation, or if there is a negative deviation 116' of the actual value from the target value, the absolute value of which is larger than the threshold value for the negative deviation 116', the switching occurs.

Step 408 is then performed.

In step 408, the electric motor 108 is controlled by the second control unit 112 based on the deviation 116 of the actual position 118 from the target position 120.

What is claimed is:

1. A steering device, comprising:
a steering rack;
an electric motor configured to set a position of the steering rack;
a first control unit configured to control the electric motor depending on a deviation of an actual position of the steering rack from a target position of the steering rack;
a second control unit configured to control the electric motor as a function of the deviation of the actual position from the target position; and
a device configured to switch from control of the electric motor by the first control unit to control of the electric motor by the second control unit as a function of a deviation of an actual value from a target value,
wherein (i) the actual value is the actual position of the steering rack and the target value is the target position of the steering rack, or (ii) the actual value is a derivative of the actual position of the steering rack and the target value is determined based on a difference between the actual position and the target position of the steering rack.

2. The steering device according to claim 1, wherein the device is configured to monitor the deviation of the actual value from the target value and to switch from the control of the electric motor by the first control unit to the control of the electric motor by the second control unit, depending on the deviation of the actual value from the target value.

3. The steering device according to claim 2, wherein the device is configured to compare the deviation of the actual value from the target value to a threshold value, and to switch from the control of the electric motor by the first control unit to the control of the electric motor by the second control unit when the deviation of the actual value from the target value is greater than the threshold value.

4. The steering device according to claim 3, wherein the device is configured to determine the threshold value based on the deviation of the actual value from the target value.

5. The steering device according to claim 4, wherein the device is configured to determine an increasingly narrow threshold value with an increasing deviation of the actual value from the target value.

6. The steering device according to claim 3, wherein the device is configured to determine the threshold value for (i) the deviation of the actual value from the target value for a positive deviation, and (ii) the deviation of the actual value from the target value for a negative deviation.

7. A vehicle, comprising:
the steering device according to claim 1.

8. A method for operating a steering device comprising a steering rack, the method comprising:

setting a position of the steering rack using an electric motor;

controlling the electric motor using a first control unit depending on a deviation of an actual position of the steering rack from a target position of the steering rack;

controlling the electric motor using a second control unit as a function of the deviation of the actual position from the target position; and switching control of the electric motor by the first control unit to control of the electric motor by the second control unit as a function of a deviation of an actual value from a target value, wherein (i) the actual value is the actual position of the steering rack and the target value is the target position of the steering rack, or (ii) the actual value is a derivative of the actual position of the steering rack and the target value is determined based on a difference between the actual position and the target position of the steering rack.

9. The method according to claim 8, further comprising:

monitoring the deviation of the actual value from the target value; and switching control of the electric motor by the first control unit to control of the electric motor by the second control unit depending on the monitored deviation of the actual value from the target value.

10. The method according to claim 9, further comprising:

comparing the deviation of the actual value from the target value to a threshold value; and switching the control of the electric motor by first control unit to the control of the electric motor by the second control unit when the compared deviation of the actual value from the target value is greater than the threshold value.

11. The method according to claim 10, wherein the threshold value is determined based on the deviation of the actual value from the target value.

12. The method according to claim 11, wherein an increasingly narrow threshold value is determined with increasing deviation of the actual value from the target value.

13. The method according to claim 10, wherein, for the deviation of the actual value from the target value, both the threshold value for a positive deviation of the actual value from the target value and a negative deviation of the actual value from the target value, is determined.

* * * * *